United States Patent Office 3,195,033
Patented July 13, 1965

3,195,033
OVERLOAD PROTECTION CIRCUIT
FOR A MOTOR
Peter David Jones, Birmingham, England, assignor to Joseph Lucas (Industries) Limited, Birmingham, England
Filed Aug. 31, 1962, Ser. No. 220,637
Claims priority, application Great Britain, Sept. 6, 1961, 31,976/61
7 Claims. (Cl. 318—447)

The object of this invention is to provide a D.C. overload protection circuit in a convenient form.

The present invention makes use of a device known as a controlled rectifier, the characteristic of which is that if a triggering pulse is applied between its gate and cathode terminals the rectifier becomes conductive, and thereafter continues to conduct, even when the triggering pulse is removed, until the anode-cathode current falls practically to zero. Furthermore, it has recently been discovered that controlled rectifiers manufactured in a certain manner have the additional property that they can be switched off by a pulse of opposite polarity (but not necessarily of equal magnitude) applied between the gate and cathode. Throughout this specification the term "switchable rectifier" is used to mean a controlled rectifier having this additional property, a convenient method of manufacturing a switchable rectifier being described in pending application No. 211,674.

A circuit in accordance with the invention comprises in combination first and second terminals adapted for connection to a D.C. source so as to be of relatively positive and negative polarity respectively, a switchable rectifier having its anode connected to the first terminal and its cathode connected to the second terminal through a first resistor, means for applying triggering pulses to the gate of the switchable rectifier to render it conductive, and means for connecting the gate to the second terminal, the arrangement being such that when the switchable rectifier is conductive it will be switched off when the current flowing in the resistor exceeds a predetermined magnitude.

Figure 1:
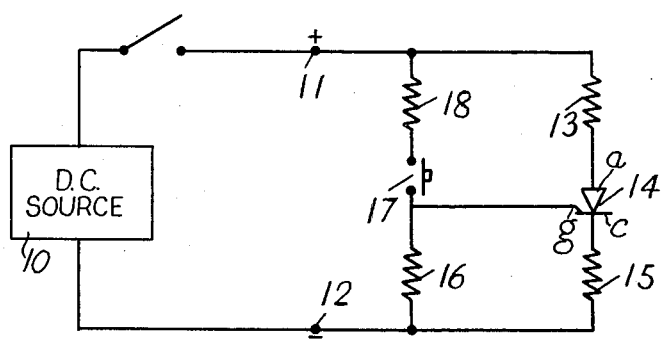
Figure 2:
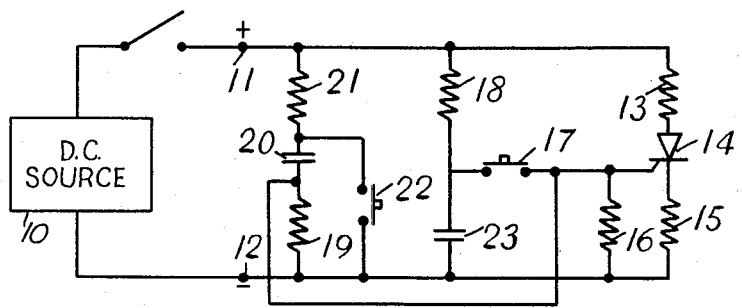
Figure 3:
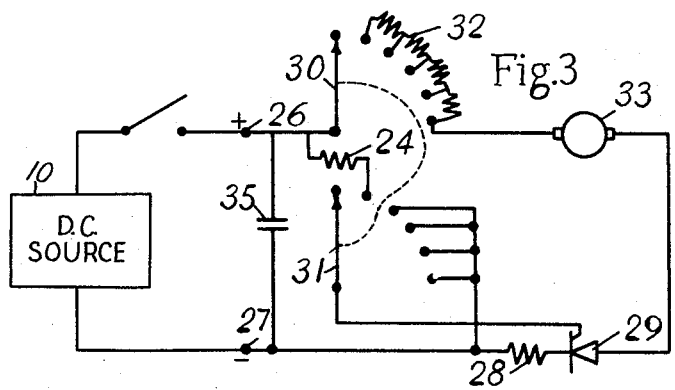

In the accompanying drawings, FIGURES 1 to 3 respectively are circuit diagrams illustrating three examples of the invention.

Referring first to FIGURE 1, there is provided a D.C. source 10 supplying power to positive and negative terminals 11, 12 respectively. The terminal 11 is connected through a load 13 to the anode $a$ of a switchable rectifier 14, having a gate $g$ and a cathode $c$ which is connected through a first resistor 15 to the terminal 12. The gate $g$ of the switchable rectifier 14 is connected through a second resistor 16 to the terminal 12 and, through a normally open switch 17 and a third resistor 18 in series, to the terminal 11.

The switchable rectifier 14 is a controlled rectifier which has the additional property that it can be turned off by negative pulses at its gate. Typically, the rectifier 14 can handle 5 amps anode-cathode current and can be turned on by a gate-cathode voltage of +3 volts, this voltage causing a gate-cathode current of about 250 milliamps to flow. In addition, a gate-cathode voltage of −6 volts will result in a gate-cathode current of about −360 milliamps and so will turn the rectifier 14 off. In operation, momentary closing of the switch 17 connects the gate $g$ to terminal 11 and the forward gate-cathode breakdown voltage is exceeded, so that the rectifier 14 is turned on and current flows in the load. The gate $g$ is now at the voltage of terminal 12 and the cathode $c$ is at a voltage between the voltages at terminals 11, 12. Thus, there is a negative voltage between the gate and cathode, but the values of the components are chosen so that this voltage does not exceed the gate-cathode reverse breakdown voltage. However, if for any reason the current flow in the load increases, the voltage at the cathode approaches the voltage of terminal 11, and so the negative gate-cathode voltage increases. The circuit is designed so that before the current in the load reaches a dangerous level, the gate-cathode breakdown voltage is exceeded and negative current flows from gate $g$ to cathode $c$ to turn rectifier 14 off. The resistor 15 could be variable and in this case the value of the load current at which the rectifier 14 is switched off could be varied.

In the modification of the first example shown in FIGURE 2, the components described before are employed. Additionally, however, the gate is connected through a fourth resistor 19 to the terminal 12, and through a first capacitor 20 and a fifth resistor 21 in series to the terminal 11. A point intermediate the capacitor 20 and resistor 21 is connected to the terminal 12 through a second normally open switch 22, whilst a point intermediate the switch 17 and resistor 18 is connected through a second capacitor 23 to the terminal 12.

In operation, the capacitors 20, 23 are initially charged to the supply voltage. Closing of the switch 17 allows positive current flow from the capacitor 23 through the gate and cathode of rectifier 14 and the resistor 15 to turn on the rectifier 14.

The resistor 15 acts in the manner already described to protect the load. If it is desired to switch off the switchable rectifier, the switch 22 is closed. The capacitor 20 is charged with its upper and lower plates positive and negative respectively, and so when the upper plate is connected to terminal 12 through switch 22 the lower plate assumes a potential more negative than the terminal 12. This lower plate is connected to the gate of rectifier 14, and so negative current is caused to flow from gate to cathode and the rectifier 14 is turned off.

FIGURE 3 illustrates a circuit similar to that shown in FIGURE 1 applied to a motor. In this example, positive and negative terminals 26, 27 are provided as before, the terminal 27 being connected through a resistor 28 to the cathode of a switchable rectifier 29. There is further provided a pair of wipers 30, 31 which are movable in synchronism as indicated by the dotted line in FIGURE 3 over two sets of contact pieces respectively, the first contact piece in each set being electrically isolated from the remainder of the circuit. The remaining contact pieces in the first set are connected to points on a resistor 32 connected through a motor armature 33 to the anode of the rectifier 29. The second contact piece in the second set is connected through a resistor 24 to the terminal 26, whilst the remaining contact pieces in the second set are connected to the terminal 27. Moreover, the wipers 30, 31 are connected respectively to the terminal 26 and to the gate of the rectifier 29.

In operation, the motor can be started by moving the wipers 30, 31 onto their respective second contact pieces, thereby switching on the rectifier 29 with resistor 24 acting as equivalent to resistor 18 in FIGURES 1 and 2. As soon as the motor speed is increased by moving the wipers 30, 31 onto the remaining contact pieces, the resistor 28 acts in the same way as the resistor 15 in FIGURE 1 the only difference being that no resistor equivalent to resistor 16 is provided. Preferably, a capacitor 35 is connected across the terminals 26, 27 to prevent switching off of the rectifier 29 and motor as a result of momentary interruption in the supply. If, however the supply fails completely the rectifier 29 will switch off and the motor will not start again, when the supply is resumed, until the wipers 30, 31 are returned to their respective second contact pieces, thus ensuring that the motor is restarted correctly.

Having thus described my invention what I claim as new and desire to secure by Letters Patent is:

1. A D.C. overload protection circuit comprising in combination a D.C. source, positive and negative terminals connected to said source, a switchable rectifier having an anode, a cathode and a gate, said switchable rectifier being turned on to permit flow of current from anode to cathode, by positive current flowing from its gate to its cathode when a predetermined positive gate-cathode voltage is exceeded, and said switchable rectifier being turned off, to prevent flow of current from anode to cathode, by negative current flowing from its gate to its cathode when a predetermined negative gate-cathode voltage is exceeded, a resistor connected in a series circuit between the cathode of the switchable rectifier and the negative terminal, a circuit connecting said anode to the positive terminal, a load in the anode-cathode circuit of the switchable rectifier, means supplying positive gate-cathode current derived from said D.C. source to turn the switchable rectifier on, and a circuit connecting said gate to the second terminal, the gate voltage of said switchable rectifier being negative with respect to the cathode voltage of said switchable rectifier when the switchable rectifier is on and the magnitude of said negative gate-cathode voltage increasing with current flow through the load so that said predetermined negative gate-cathode voltage is exceeded and said switchable rectifier turned off when the current flowing in the load reaches a predetermined value.

2. A D.C. overload protection circuit comprising in combination a D.C. source, positive and negative terminals connected to said source, a switchable rectifier having an anode, a cathode and a gate, said switchable rectifier being turned on to permit flow of current from anode to cathode, by positive current flowing from its gate to its cathode when a predetermined positive gate-cathode voltage is exceeded, and said switchable rectifier being turned off, to prevent flow of current from anode to cathode, by negative current flowing from its gate to its cathode when a predetermined negative gate-cathode voltage is exceeded, a resistor connected between the cathode of the switchable rectifier and the negative terminal, a load connected between the anode of said switchable rectifier and said positive terminal, a resistor connected between the gate of said switchable rectifier and the negative terminal, and a normally open switch and a resistor connected in series between said gate and the positive terminal, momentary closing of said switch permitting positive current flow through the gate and cathode of the switchable rectifier to turn it on, the gate voltage of said switchable rectifier being negative with respect to the cathode voltage of said switchable rectifier when the switchable rectifier is on and the magnitude of said negative gate-cathode voltage increasing with current flow through the load so that said predetermined negative gate-cathode voltage is exceeded and said switchable rectifier turned off when the current flowing in the load reaches a predetermined value.

3. A D.C. overload protection circuit comprising in combination a D.C. source, positive and negative terminals connected to said source, a switchable rectifier having an anode, a cathode and a gate, said switchable rectifier being turned on to permit flow of current from anode to its cathode when a predetermined positive gate-cathode voltage is exceeded, and said switchable rectifier being turned off, to prevent flow of current from anode to cathode, by negative current flowing from its gate to its cathode when a predetermined negative gate-cathode voltage is exceeded, a resistor connected between the cathode of the switchable rectifier and the negative terminal, a load connected between the anode of said switchable rectifier and said positive terminal, a resistor connected between said gate and the negative terminal, and a resistor and a capacitor connected in series between the positive and negative terminals and having a point therebetween connected to said gate through a normally open switch, said capacitor charging to the voltage of said source when said switch is open and discharging through said gate and cathode on momentary closing of said switch to turn the switchable rectifier on, the gate voltage of said switchable rectifier being negative with respect to the cathode voltage of said switchable rectifier when the switchable rectifier is on and the magnitude of said negative gate-cathode voltage increasing with current flow through the load so that said predetermined negative gate-cathode voltage is exceeded and said switchable rectifier turned off when the current flowing in the load reaches a predetermined value.

4. A D.C. overload protection circuit as claimed in claim 3 including means for turning said switchable rectifier off independently of current flow in said load, said means comprising a second capacitor, a pair of resistors through which opposite sides of said second capacitor are connected respectively to the positive and negative terminals, a connection between the side of the capacitor connected to the negative terminal and said gate, and a second normally open switch connected between the side of the capacitor connected to the positive terminal and said negative terminal, closing of said second switch turning off the switchable rectifier.

5. A D.C. overload protection circuit comprising in combination a D.C. source, positive and negative terminals connected to said source, a switchable rectifier having an anode, a cathode and a gate, said switchable rectifier being turned on to permit flow of current from anode to cathode, by positive current flowing from its gate to its cathode when a predetermined positive gate-cathode voltage is exceeded, and said switchable rectifier being turned off, to prevent flow of current from anode to cathode, by negative current flowing from its gate to its cathode when a predetermined negative gate-cathode voltage is exceeded, a resistor connected between the cathode of the switchable rectifier and the negative terminal, a load connected between the anode of said switchable rectifier and said positive terminal, a wiper connected to said gate, a first contact piece, a resistor connecting the first contact piece to the positive terminal, a second contact piece connected to the negative terminal, said wiper having a first position in which said gate is disconnected from said D.C. source, a second position in contact with said first contact piece whereby positive current flows from said gate to said cathode to turn said switchable rectifier on, and a third position in contact with said second contact piece, the gate voltage of said switchable rectifier being negative with respect to the cathode voltage of said switchable rectifier when the switchable rectifier is on and the magnitude of said negative gate-cathode voltage increasing with current flow through the load so that said predetermined negative gate-cathode voltage is exceeded and said switchable rectifier turned off when the current flowing in the load reaches a predetermined value.

6. A D.C. overload protection circuit comprising in combination a D.C. source, positive and negative terminals connected to said source, a switchable rectifier having an anode, a cathode and a gate, said switchable rectifier being turned on, to permit flow of current from anode to cathode, by positive current flowing from its gate to its cathode when a predetermined positive gate-cathode voltage is exceeded, and said switchable rectifier being turned off, to prevent flow of current from anode to cathode, by negative current flowing from its gate to its cathode when a predetermined negative gate-cathode voltage is exceeded, a resistor connected between the cathode of the switchable rectifier and the negative terminal, a load connected between the anode of said switchable rectifier and said positive terminal, said load comprising the armature of a motor and a variable resistor in series, a first wiper connected to said positive terminal and having a first position in which no connection is made to said armature, a second position in which said positive terminal is connected to said armature through said variable resistor, and further positions in which portions of said variable resistor are removed from the circuit to said armature to increase the current flow therein, and a second wiper connected to the gate of the switchable rectifier and movable in synchronism with the first wiper between a first position in which said second wiper is disconnected from said D.C. source, a second position and further positions, a resistor through which said second wiper is connected to said positive terminal when the second wiper is in said second position so that positive current flows from said gate to said cathode to turn said switchable rectifier on, and means connecting said second wiper to said negative terminal in each of said further positions of the second wiper, the gate voltage of said switchable rectifier being negative with respect to the cathode voltage of said switchable rectifier when the switchable rectifier is on and the magnitude of said negative gate-cathode voltage increasing with current flow through the load so that said predetermined negative gate-cathode voltage is exceeded and said switchable rectifier turned off when the current flowing in the load reaches a predetermined value.

7. A D.C. overload protection circuit as claimed in claim 6 including a capacitor interconnecting said positive and negative terminals.

References Cited by the Examiner

UNITED STATES PATENTS 3,040,270   6/62   Gutzwiller _____ 307—88.5 X

ORIS L. RADER, *Primary Examiner.*